US007909270B2

(12) United States Patent
Bertini et al.

(10) Patent No.: US 7,909,270 B2
(45) Date of Patent: Mar. 22, 2011

(54) VALVE ASSEMBLY FOR AN INJECTION VALVE AND INJECTION VALVE

(75) Inventors: Paolo Bertini, Livorno (IT); Mauro Grandi, Livorno (IT)

(73) Assignee: Continental Automotive GmbH, Hannover (DE)

( * ) Notice: Subject to any disclaimer, the term of this patent is extended or adjusted under 35 U.S.C. 154(b) by 195 days.

(21) Appl. No.: 12/327,095

(22) Filed: Dec. 3, 2008

(65) Prior Publication Data

US 2009/0140079 A1 Jun. 4, 2009

(51) Int. Cl.

| | |
|---|---|
| ***F02M 61/12*** | (2006.01) |
| ***F02M 61/10*** | (2006.01) |
| ***B32B 9/00*** | (2006.01) |
| *F02M 51/06* | (2006.01) |
| *F02M 51/00* | (2006.01) |

(52) U.S. Cl. ............ 239/533.11; 239/533.2; 239/585.5; 428/408

(58) Field of Classification Search ............. 239/88–96, 239/533.2–533.12, 585.1–585.5, 596, 602; 428/336, 408; 427/249.6, 249.7, 249.15, 427/249.16; 251/129.01, 129.15, 129.21; 123/472

See application file for complete search history.

(56) References Cited

U.S. PATENT DOCUMENTS

| | | | | |
|---|---|---|---|---|
| 5,731,045 | A * | 3/1998 | Dearnaley et al. | 427/527 |
| 5,783,261 | A | 7/1998 | Potter et al. | |
| 6,508,416 | B1 * | 1/2003 | Mastro et al. | 239/585.1 |
| 6,715,693 | B1 * | 4/2004 | Dam et al. | 239/88 |
| 6,802,457 | B1 * | 10/2004 | Campion et al. | 239/88 |
| 2004/0112993 | A1 * | 6/2004 | Shinogle | 239/585.1 |
| 2004/0195386 | A1 * | 10/2004 | Shafer et al. | 239/533.2 |
| 2004/0251312 | A1 * | 12/2004 | Campion et al. | 239/88 |
| 2005/0186424 | A1 * | 8/2005 | Murakami et al. | 428/408 |
| 2006/0105171 | A1 * | 5/2006 | LaBarge et al. | 428/408 |
| 2009/0026292 | A1 * | 1/2009 | Davies | 239/533.2 |

FOREIGN PATENT DOCUMENTS

| | | | |
|---|---|---|---|
| DE | 10038954 | A1 | 2/2002 |
| EP | 1150004 | A2 | 10/2001 |
| WO | WO 0161182 | A1 | 8/2001 |

* cited by examiner

*Primary Examiner* — Darren W Gorman
(74) *Attorney, Agent, or Firm* — King & Spalding L.L.P.

(57) ABSTRACT

A valve assembly (80) of an injection valve (82) has a valve body (4) including a central longitudinal axis (L), the valve body (4) having a cavity (8) forming an inner surface (18) of the valve body (4), the cavity (8) having a fluid inlet portion (42), and a fluid outlet portion (44), a valve needle (10) axially movable in the cavity (8), the valve needle (10) preventing a fluid flow through the fluid outlet portion (44) in a closing position and releasing the fluid flow through the fluid outlet portion (44) in further positions, the valve needle (10) and/or the inner surface (18) of the valve body (4) having a surface layer (48) with a tungsten carbide layer (70) and a carbon layer (72).

20 Claims, 3 Drawing Sheets

VALVE ASSEMBLY FOR AN INJECTION VALVE AND INJECTION VALVE

CROSS-REFERENCE TO RELATED APPLICATIONS

This application claims priority to EP Application No. 07023476 filed Dec. 4, 2007, the contents of which is incorporated herein by reference in its entirety.

TECHNICAL FIELD

The invention relates to a valve assembly for an injection valve and an injection valve.

BACKGROUND

Injection valves are in widespread use, in particular for an internal combustion engine where they may be arranged in order to dose the fluid into an intake manifold of the internal combustion engine or directly into the combustion chamber of a cylinder of the internal combustion engine.

Injection valves are manufactured in various forms in order to satisfy the various needs for the various combustion engines. Therefore, for example, their length, their diameter, and all the various elements of the injection valve being responsible for the way the fluid is dosed may vary in a wide range. In addition to that, injection valves can accommodate an actuator for actuating a needle of the injection valve, which may, for example, be an electromagnetic actuator or a piezoelectric actuator.

In order to enhance the combustion process in view of degradation of unwanted emissions, the respective injection valve may be suited to dose fluids under high pressures. The pressures may be in case of a gasoline engine, for example, in the range of up to 200 bar.

SUMMARY

According to various embodiments, a valve assembly can be created for an injection valve and an injection valve can be created which is simple to be manufactured and which facilitates a reliable and precise function.

According to an embodiment, a valve assembly of an injection valve, may comprise a valve body including a central longitudinal axis, the valve body comprising a cavity forming an inner surface of the valve body, the cavity having a fluid inlet portion, and a fluid outlet portion, a valve needle axially movable in the cavity, the valve needle preventing a fluid flow through the fluid outlet portion in a closing position and releasing the fluid flow through the fluid outlet portion in further positions, wherein at least one of the valve needle and the inner surface of the valve body having a surface layer comprising a tungsten carbide layer and a carbon layer.

According to a further embodiment, the valve body may comprise a needle seat, the valve needle may comprise a seat part with a sealing portion, the sealing portion resting on the needle seat in the closing position, with the sealing portion of at least one of the valve needle and the needle seat comprising the surface layer. According to a further embodiment, at least one of the surface layer of the sealing portion and the surface layer of the needle seat may have a thickness of up to 3 μm. According to a further embodiment, the valve needle may comprise a front surface area facing away from the fluid outlet portion and being enabled to be in contact with a corresponding inner surface of the valve body, with at least one of the front surface area and the corresponding inner surface comprising the surface layer. According to a further embodiment, at least one of the surface layer of the front surface area and the surface layer of the corresponding inner surface may have a thickness of 0.5 μm up to 1.5 μm. According to a further embodiment, the valve body may comprise a guide element guiding the valve needle in axial direction, the valve needle comprising a slide area being in a sliding contact with the guide element, with at least one of the slide area of the valve needle and the guide element comprising the surface layer. According to a further embodiment, at least one of the surface layer of the slide area and the surface layer of the guide element may have a thickness of 0.5 μm to 2 μm. According to a further embodiment, the surface layer may comprise a plurality of tungsten carbide layers and carbon layers. According to a further embodiment, the surface layer may comprise a chromium layer.

According to another embodiment, an injection valve with a housing and an actuator unit may have such a valve assembly of an injection valve.

BRIEF DESCRIPTION OF THE DRAWINGS

Exemplary embodiments of the invention are explained in the following with the aid of schematic drawings. These are as follows.

Elements of the same design and function that appear in different illustrations are identified by the same reference characters.

DETAILED DESCRIPTION

Figure 1:
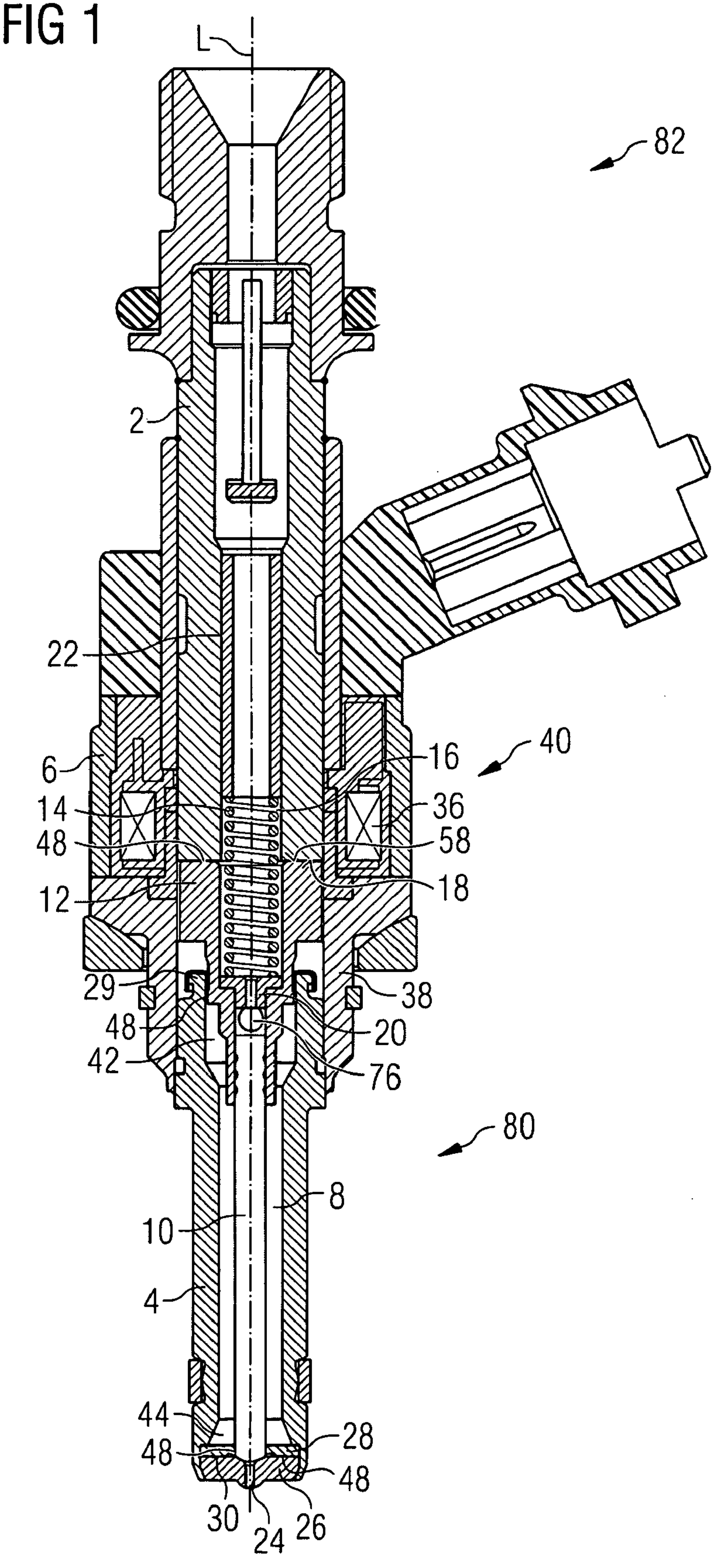
FIG. 1, an injection valve in a longitudinal section view.

According to various embodiments, a valve assembly of an injection valve may comprise a valve body including a central longitudinal axis, the valve body comprising a cavity forming an inner surface of the valve body, the cavity having a fluid inlet portion, and a fluid outlet portion, a valve needle axially movable in the cavity, the valve needle preventing a fluid flow through the fluid outlet portion in a closing position and releasing the fluid flow through the fluid outlet portion in further positions, the valve needle and/or the inner surface of the valve body having a surface layer comprising a tungsten carbide layer and a carbon layer.

The surface layer can be arranged on parts of the valve needle and/or the inner surface of the valve body or on the whole valve needle and/or the whole inner surface of the valve body.

This has the advantage that good wearing characteristics of the valve needle and/or the valve body are possible in areas where the valve needle impacts on the valve body. The seat part of the valve needle may be better adapted to prevent a fluid flow through the fluid outlet portion in a closing position of the valve needle as deformations and surface roughness of the sealing portion of the seat body can be prevented. This can result in a good dynamic performance of the injection valve by the reduction of transient effects. Furthermore, a low sliding coefficient in sliding areas between the valve needle and the valve body is possible. Additionally, no further layers, in particular no further metal layers, are necessary. Consequently, a high life-time of the valve assembly is possible.

In an embodiment, the valve body comprises a needle seat, the valve needle comprises a seat part with a sealing portion, the sealing portion rests on the needle seat in the closing position, and the sealing portion of the valve needle and/or the needle seat comprises the surface layer. This has the advantage that good wearing characteristics of the valve needle and/or the valve body in impact sections of the valve needle on the valve body can be obtained.

In a further embodiment, the surface layer of the sealing portion and/or the surface layer of the needle seat have a thickness of up to 3 μm. This has the advantage that the thickness of the surface layer is sufficient to obtain good conditions against wearing in the seat area.

In a further embodiment, the valve needle comprises a front surface area which is facing away from the fluid outlet portion and which is enabled to be in contact with a corresponding inner surface of the valve body, with the front surface area and/or the corresponding inner surface comprising the surface layer. This has the advantage that good wearing characteristics of the valve needle and/or the valve body in impact sections of the valve needle on the valve body are possible.

In a further embodiment, the surface layer of the front surface area and/or the surface layer of the corresponding inner surface have a thickness of 0.5 μm up to 1.5 μm. This has the advantage that the thickness of the surface layer is sufficient to obtain good conditions against wearing.

In a further embodiment, the valve body comprises a guide element guiding the valve needle in axial direction, the valve needle comprises a slide area being in a sliding contact with the guide element, and the slide area of the valve needle and/or the guide element comprises the surface layer. This makes it possible to obtain a low sliding coefficient between the valve needle and the valve body.

In a further embodiment, the surface layer of the slide area and/or the surface layer of the guide element have a thickness of 0.5 μm to 2 μm. By this, it is possible to obtain a low sliding coefficient between the valve needle and the valve body with only small changes of the geometrical conditions of the valve needle and/or the guide element.

In a further embodiment, the surface layer comprises a plurality of tungsten carbide layers and carbon layers. A plurality of thin layers of tungsten carbide and carbon makes it possible to obtain very good wearing and sliding conditions in different areas of the valve needle and/or the valve body.

In a further embodiment, the surface layer comprises a chromium layer. The chromium layer can form an adhesive layer of the surface layer for mechanically coupling the surface layer to the valve needle.

An injection valve 82 (FIG. 1) that is in particular suitable for dosing fuel to an internal combustion engine comprises a valve assembly 80 and a housing 6.

The valve assembly 80 comprises a valve body 4 with a central longitudinal axis L and a cavity 8 which takes in a valve needle 10. The valve body 4 comprises an inlet tube 2.

The valve needle 10 comprises an armature 12. The cavity 8 of the valve body 4 forms an inner surface 18.

In the inlet tube 2 and in the armature 12, a recess 16 is provided. A spring 14 is arranged in the recess 16 of the inlet tube 2 and the armature 12. Preferably, it rests on a spring seat being formed by an anti-bounce disk 20. By this, the spring 14 is mechanically coupled to the needle 10. An adjusting tube 22 is provided in the recess 16 of the inlet tube 2. The adjusting tube 22 forms a further seat for the spring 14 and may be axially moved during the manufacturing process of the fluid injection valve in order to preload the spring 14 in a desired way.

In a closing position of the valve needle 10, it sealingly rests on a needle seat 46 of a seat body 26, by this preventing a fluid flow through at least one injection nozzle 24. The injection nozzle 24 may be, for example, an injection hole. However, it may also be of some other type suitable for dosing fluid. The seat body 26 may be made in one part with the valve body 4 or be a separate part.

Furthermore, a lower guide element 28 is provided for guiding the needle 10 and a swirl disk 30 for giving the fluid a radial velocity component.

In addition to that, the valve body 4 comprises an upper guide element 29 for guiding the valve needle 10, in particular the armature 12 of the valve needle 10.

The injection valve 82 is provided with an actuator unit 40 that comprises preferably an electromagnetic actuator with a coil 36 which is preferably over-molded. A valve body shell 38, the armature 12 and the inlet tube 2 are forming an electromagnetic circuit. The actuator unit 40 may, however, also comprise another type of actuator, which is known to persons skilled in the art for that purpose. Such an actuator may be, for example, a piezoelectric actuator.

The valve assembly 80 has a fluid inlet portion 42 which is provided in the valve body 4. The fluid inlet portion 42 communicates with a fluid outlet portion 44 which is part of the cavity 8 near the seat body 26.

The valve needle 10 has a seat part 50 being adjacent to the seat body 26.

Figure 2:
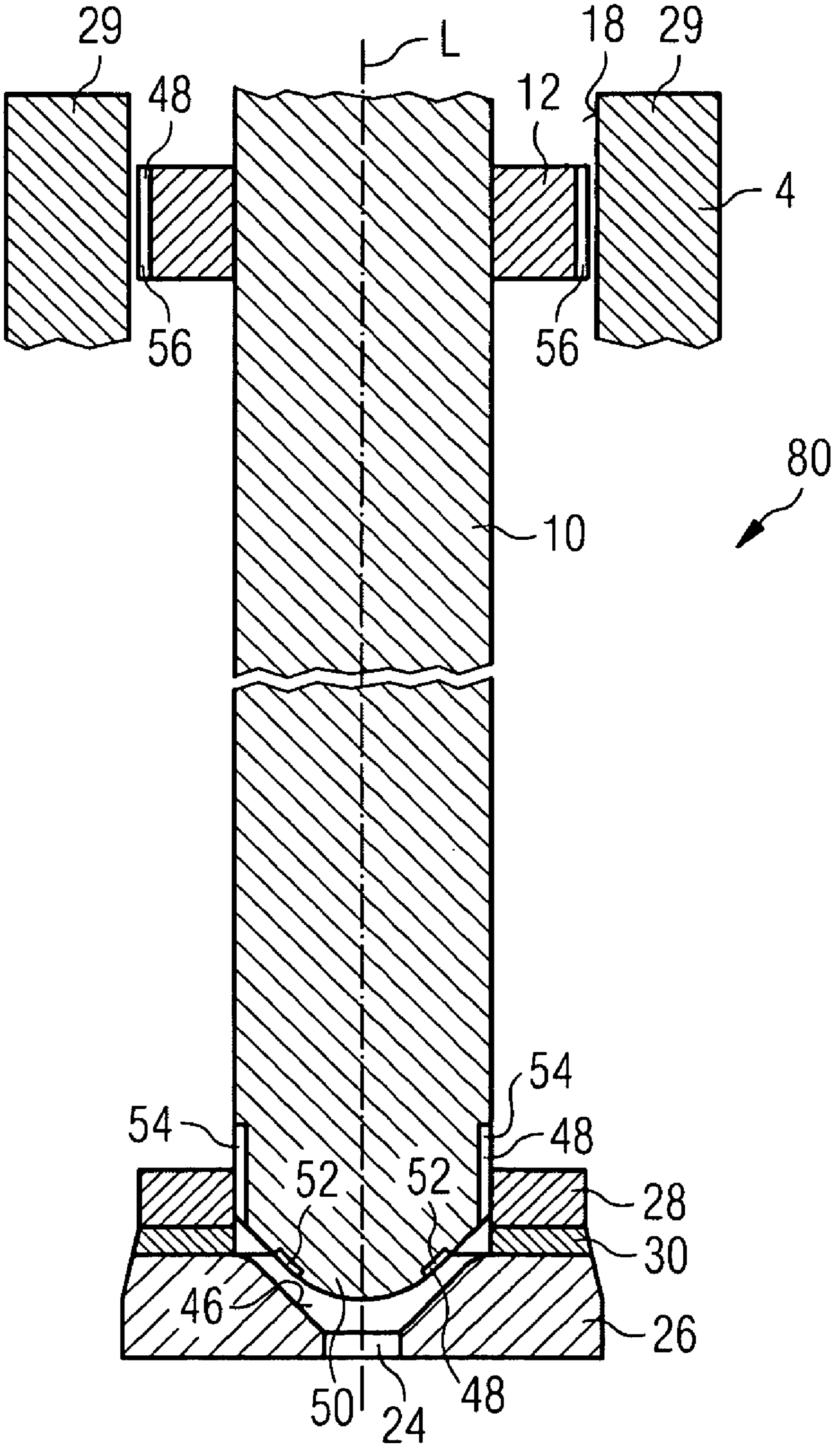
FIG. 2, an enlarged and detailed view of a first embodiment of a valve assembly of the injection valve in a longitudinal section view, FIG. 3, an enlarged and detailed view of a second embodiment of the valve assembly of the injection valve in a longitudinal section view, and FIG. 4, a surface layer of the valve assembly of the injection valve in a sectional view.

In the embodiment shown in FIG. 2, the seat part 50 has a sealing portion 52. In the closing position of the valve assembly 80 the sealing portion 52 rests on the needle seat 46. The sealing portion 52 of the valve needle 10 has a surface layer 48. The surface layer 48 of the sealing portion 52 has a thickness of 0.8 μm to 3.0 μm.

Figure 4:
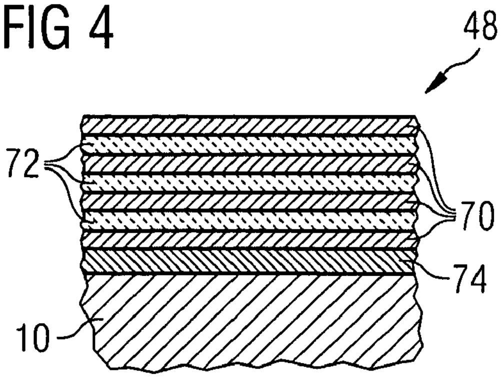

As can be seen in FIG. 4, the surface layer 48 is built up as a stack of layers comprising tungsten carbide layers 70 and carbon layers 72. Preferably, the tungsten carbide layers and the carbon layers 72 are alternating as shown in FIG. 4. Preferably, each of the tungsten carbide layers 70 and the carbon layers 72 has a thickness of a few atoms. Additionally, the surface layer 48 has a chromium layer 74 which forms an adhesive layer of the surface layer 48 to mechanically coupling the surface layer 48 to the valve needle 10. In a preferred embodiment, the chromium layer 74 and the adjacent tungsten carbide layer 70 are forming a common intermediate layer which enables a good adhesion between the valve needle 10 and the further layers 70, 72 of the surface layer 48.

Furthermore, the armature 12 of the valve needle 10 has a front surface area 58 which faces away from the fluid outlet portion 44. The front surface area 58 is facing the corresponding inner surface 18 of the inlet tube 2. The front surface area 58 has a surface layer 48 with the tungsten carbide layers 70 and the carbon layers 72. The surface layer 48 of the front surface area 58 has a thickness of 0.5 μm up to 1.5 μm.

Furthermore, the valve needle 10 has a slide area 54 near the seat part 50 and the armature 12 of the valve needle 10 has a slide area 56. The slide area 54 near the seat part 50 is in a sliding contact with the lower guide element 28, the slide area 56 of the armature 12 is in a sliding contact with the upper guide element 29. The slide areas 54, 56 of the valve needle 10 have a surface layer 48 each, with the tungsten layers 70 and the carbon layers 72. The surface layer 48 of the slide area 54 being in sliding contact with the lower guide element 28 has a thickness of 0.8 μm to 2.0 μm. The surface layer 48 of the slide area 56 of the armature 12 has a thickness of 0.5 μm to 2.0 μm.

Figure 3:
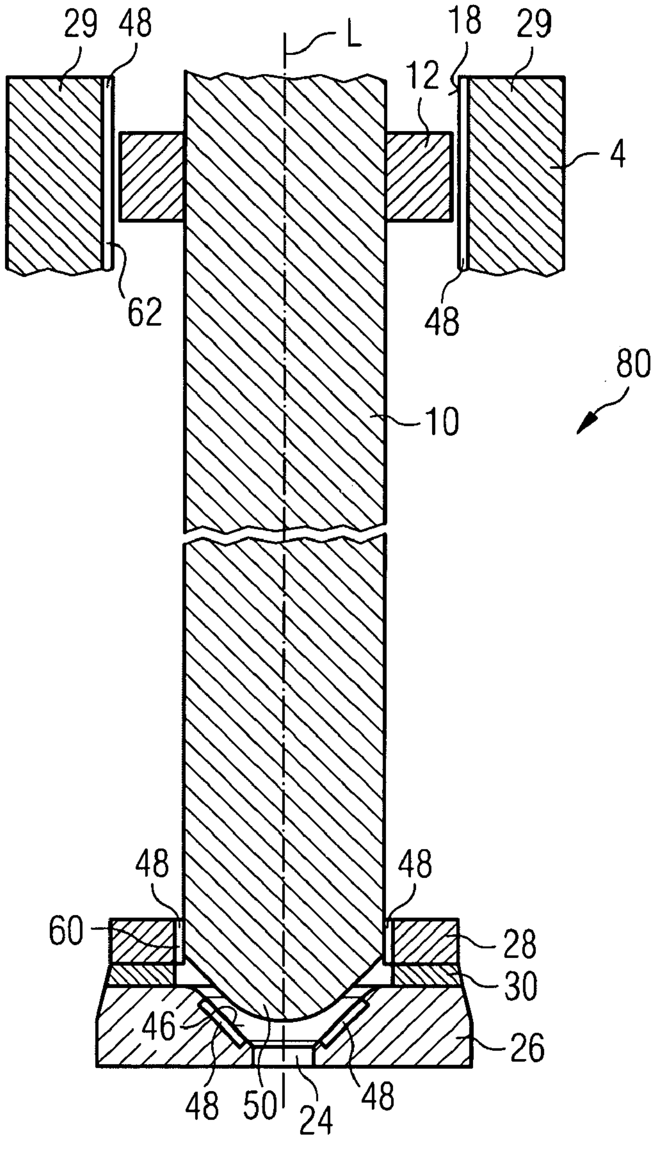

In the embodiment of the valve assembly 80 shown in FIG. 3, the lower guide element 28 has a slide area 60 with the surface layer 48. The upper guide element 29 has a slide area 62 with the surface layer 48. A further of the surface layers 48 is arranged on the needle seat 46 of the seat body 26. The surface layer 48 of the needle seat 46 has a thickness of 0.8 um to 3.0 μm. The surface layer 48 of the inner surface 18 facing the front surface area 58 has a thickness of 0.4 μm to 1.5 μm. The surface layer on the lower guide element 28 has a thickness of 0.8 μm to 2.0 μm. The surface layer 48 on the upper guide element 29 has a thickness of 0.5 μm to 2.0 μm.

In the following, the function of the injection valve is described in detail:

The fluid is led from the inlet tube 2 to the hollow valve needle 10 and then through an orifice 76 in the valve needle 10 to the fluid inlet portion 42 and the fluid outlet portion 44.

The spring 14 forces the valve needle 10 via the anti-bounce disk 20 towards the actuator unit 40. In the case when the actuator unit 40 is de-energized the spring 14 can force the valve needle 10 to move in axial direction in its closing position. It is depending on the force balance between the force on the valve needle 10 caused by the actuator unit 40 and the force on the valve needle 10 caused by the spring 14 whether the valve needle 10 is in its closing position or not.

In the closing position of the valve needle 10 the seat part 50 of the valve needle 10 sealingly rests on the needle seat 46 of the seat body 26 and consequently a fluid flow through the fluid outlet portion 44 and the injection nozzle 24 is prevented.

In the case that the actuator unit 40 gets energized, the actuator unit 40 may exert a force on the valve needle 10. The valve needle 10 is able to move in axial direction out of the closing position. Outside of the closing position of the valve needle 10, there is a gap between the seat body 26 and the valve needle 10 which enables a fluid flow through the injection nozzle 24.

The movement of the valve needle 10 results in an impact of the valve needle 10 on the valve body 4. In particular, the seat part 50 of the valve needle 10 forms an impact section relative to the needle seat 46 of the seat body 26. By coating the sealing portion 52 of the valve needle 10 and/or the needle seat 46 of the seat body 26, good wearing characteristics of the seat part 50 of the valve needle 10 and/or the seat body 26 can be obtained. Furthermore, the friction coefficient between the valve needle 10 and the seat body 26 is very low. By this, leakage failures of the valve assembly 80 can be kept low and a high lifetime of the valve assembly 80 is possible.

Covering the front surface area 58 of the valve needle 10 with the surface layer 48 allows keeping the wearing effect on the inner surface 18 facing the front surface area 58 very small.

The coating of the slide areas 54, 56 of the valve needle 10 with the surface layer 48 enables a low sliding coefficient between the valve needle 10 and the guide elements 28, 29 of the valve body 4. By this, the wearing effect of the lower guide element 28 and the upper guide element 29 can be kept small.

In general, it is preferred that the thickness of the surface layer 48 on the seat part 50 of the valve needle 10 is the highest compared with the further surface layers 48 on the valve needle 10. This is due to the very high load in the case of the impact of the valve needle 10 on the seat body 26. The thickness of the surface layer 48 on the front surface area 58 of the valve needle 10 is low compared with the further surface layers 48. Preferably, the thickness of the surface layers 48 of the slide areas 54, 56 of the valve 10 is higher than the thickness of the surface layer 48 of the front surface area 58 of the valve needle 10 and is lower than the thickness of the surface layer 48 of the seat part 50 of the valve needle 10.

Corresponding to this, preferably the thickness of the surface layer 48 on the seat body 26 is the highest compared with the further surface layers 48 on the inner surface 18 of the valve body 4. The thickness of the surface layer 48 on the inner surface 18 facing the front surface area 58 is low compared with the further surface layers 48 on the inner surface 18. The thickness of the surface layers 48 on the guide elements 28, 29 is higher than the thickness of the inner surface 18 facing the front surface area 58 and is lower than the thickness of the surface layer 48 of the seat body 26.

The selection of an appropriate thickness of the different surface layers 48 enables to obtain a good result for the wearing conditions of the valve needle and/or the valve body 4 and the sliding conditions between the valve needle 10 and the valve body 4 in connection with only small changes of the geometry of the valve needle 10 or the valve body 4.

What is claimed is:

1. A valve assembly of an injection valve, comprising:

a valve body including a central longitudinal axis, the valve body comprising a cavity forming an inner surface of the valve body, the cavity having a fluid inlet portion, and a fluid outlet portion, a valve needle axially movable in the cavity, the valve needle preventing a fluid flow through the fluid outlet portion in a closing position and releasing the fluid flow through the fluid outlet portion in further positions, a recessed area formed in at least one of the valve needle and the inner surface of the valve body, the recessed area formed adjacent at least one non-recessed area, a surface layer comprising a tungsten carbide layer and a carbon layer, the surface layer formed over one of the recessed areas but not formed over the at least one non-recessed area adjacent the recessed area, such that an outer surface of the surface layer is substantially flush with the at least one non-recessed area adjacent the recessed area.

2. The valve assembly according to claim 1, wherein the valve body comprising a needle seat, the valve needle comprising a seat part with a sealing portion, the sealing portion resting on the needle seat in the closing position, with the sealing portion of at least one of the valve needle and the needle seat comprising the surface layer.

3. The valve assembly according to claim 2, wherein at least one of the surface layer of the sealing portion and the surface layer of the needle seat having a thickness of up to 3 μm.

4. The valve assembly according to claim 1, wherein the valve needle comprising a front surface area facing away from the fluid outlet portion and being enabled to be in contact with a corresponding inner surface of the valve body, with at least one of the front surface area and the corresponding inner surface comprising the surface layer.

5. The valve assembly according to claim 4, wherein at least one of the surface layer of the front surface area and the surface layer of the corresponding inner surface having a thickness of 0.5 μm up to 1.5 μm.

6. The valve assembly according to claim 1, wherein the valve body comprising a guide element guiding the valve needle in axial direction, the valve needle comprising a slide area being in a sliding contact with the guide element, with at least one of the slide area of the valve needle and the guide element comprising the surface layer.

7. The valve assembly according to claim 6, wherein at least one of the surface layer of the slide area and the surface layer of the guide element having a thickness of 0.5 μm to 2 μm.

8. The valve assembly according to claim 1, wherein the surface layer comprising a plurality of tungsten carbide layers and carbon layers.

9. The valve assembly according to claim 1, wherein the surface layer comprising a chromium layer.

10. An injection valve with a housing, an actuator unit and a valve assembly of an injection valve, the valve assembly comprising:

- a valve body including a central longitudinal axis, the valve body comprising a cavity forming an inner surface of the valve body, the cavity having a fluid inlet portion, and a fluid outlet portion,
- a valve needle axially movable in the cavity, the valve needle preventing a fluid flow through the fluid outlet portion in a closing position and releasing the fluid flow through the fluid outlet portion in further positions,
- a recessed area formed in at least one of the valve needle and the inner surface of the valve body, the recessed area formed adjacent at least one non-recessed area,
- a surface layer comprising a tungsten carbide layer and a carbon layer, the surface layer formed over the recessed area but not formed over the at least one non-recessed area adjacent the recessed area, such that an outer surface of the surface layer is substantially flush with the at least one non-recessed area adjacent the recessed area.

11. The injection valve according to claim 10, wherein the valve body comprising a needle seat, the valve needle comprising a seat part with a sealing portion, the sealing portion resting on the needle seat in the closing position, with the sealing portion of at least one of the valve needle and the needle seat comprising the surface layer.

12. The injection valve according to claim 11, wherein at least one of the surface layer of the sealing portion and the surface layer of the needle seat having a thickness of up to 3 μm.

13. The injection valve according to claim 11, wherein the valve needle comprising a front surface area facing away from the fluid outlet portion and being enabled to be in contact with a corresponding inner surface of the valve body, with at least one of the front surface area and the corresponding inner surface comprising the surface layer.

14. The injection valve according to claim 13, wherein at least one of the surface layer of the front surface area and the surface layer of the corresponding inner surface having a thickness of 0.5 μm up to 1.5 μm.

15. The injection valve according to claim 10, wherein the valve body comprising a guide element guiding the valve needle in axial direction, the valve needle comprising a slide area being in a sliding contact with the guide element, with at least one of the slide area of the valve needle and the guide element comprising the surface layer.

16. The injection valve according to claim 15, wherein at least one of the surface layer of the slide area and the surface layer of the guide element having a thickness of 0.5 μm to 2 μm.

17. The injection valve according to claim 10, wherein the surface layer comprising a plurality of tungsten carbide layers and carbon layers.

18. The injection valve according to claim 10, wherein the surface layer comprising a chromium layer.

19. A method for producing a valve assembly of an injection valve, comprising the steps of:

- providing a valve body including a central longitudinal axis, the valve body comprising a cavity forming an inner surface of the valve body, the cavity having a fluid inlet portion, and a fluid outlet portion,
- providing a valve needle axially movable in the cavity, the valve needle preventing a fluid flow through the fluid outlet portion in a closing position and releasing the fluid flow through the fluid outlet portion in further positions,
- providing at least one of the valve needle and the inner surface of the valve body with a surface layer comprising a tungsten carbide layer and a carbon layer,
- providing a recessed area in at least one of the valve needle and the inner surface of the valve body, the recessed area formed adjacent at least one non-recessed area,
- forming a surface layer over the recessed area but not over the at least one non-recessed area adjacent the recessed area, such that an outer surface of the surface layer is substantially flush with the at least one non-recessed area adjacent the recessed area, the surface layer comprising a tungsten carbide layer and a carbon layer.

20. he method according to claim 19, further comprising the steps of providing the valve body with a needle seat, and providing the valve needle with a seat part with a sealing portion, the sealing portion resting on the needle seat in the closing position, with the sealing portion of at least one of the valve needle and the needle seat comprising the surface layer.

* * * * *